US008612467B2

(12) United States Patent
Bernard

(10) Patent No.: US 8,612,467 B2
(45) Date of Patent: Dec. 17, 2013

(54) CACHING NAME-BASED FILTERS IN A FULL-TEXT SEARCH ENGINE

(75) Inventor: Emmanuel Bernard, Atlanta, GA (US)

(73) Assignee: Red Hat, Inc., Raleigh, NC (US)

( * ) Notice: Subject to any disclaimer, the term of this patent is extended or adjusted under 35 U.S.C. 154(b) by 759 days.

(21) Appl. No.: 12/074,042

(22) Filed: Feb. 28, 2008

(65) Prior Publication Data

US 2009/0222465 A1 Sep. 3, 2009

(51) Int. Cl.
*G06F 7/00* (2006.01)
(52) U.S. Cl.
USPC ............ 707/760; 707/706; 707/758; 709/246
(58) Field of Classification Search
USPC ........... 707/705–780; 709/246–247; 719/340, 719/369
See application file for complete search history.

(56) References Cited

U.S. PATENT DOCUMENTS 6,336,117 B1 * 1/2002 Massarani ............................. 1/1
2008/0222121 A1 * 9/2008 Wiessler et al. .................. 707/4

OTHER PUBLICATIONS

*Hibernate EntityManager, User guide*, Version: 3.3.0.GA, Red Hat Middleware LLC, Mar. 19, 2007.
*Hibernate Search, Apache Lucene Integration*, Version: 3.0.1.GA, Red Hat Middleware LLC, Feb. 20, 2008.
*Hibernate Shards, Horizontal Partitioning With Hibernate*, Version: 3.0.0.Beta2, Red Hat Middleware LLC, Aug. 2, 2007.
*Hibernate Tools, Reference Guide*, Version: 3.2.2.Beta10, Red Hate Middleware LLC, Aug. 14, 2007.
*Hibernate Validator, Reference Guide*, Version: 3.0.0.GA, Red Hat Middleware LLC, Mar. 19, 2007.
U.S. Appl. No. 12/074,090, Notice of Allowance dated Apr. 26, 2010, 15 pages.

* cited by examiner

*Primary Examiner* — Tony Mahmoudi
*Assistant Examiner* — Tuan-Khanh Phan
(74) *Attorney, Agent, or Firm* — Lowenstein Sandler LLP

(57) ABSTRACT

Techniques for filtering a full-text search result in a full-text search engine level are described herein. According to one embodiment, in response to a search query received at an ORM system for a full-text search in a relational database, a full-text search engine is invoked to perform the requested full-text search based on the search query. A filter is utilized to filter a search result generated from the full-text search engine using a filter object representing a filter associated with the search query and returning the filtered result to the application client. Thereafter, the filter object is cached in a cache memory of the ORM system such that the cached filter object can be used in subsequent search queries without having to recreating the same filter object. Other methods and apparatuses are also described.

17 Claims, 11 Drawing Sheets

```
fullTextQuery = s.createFullTextQuery( query, Driver.class );    301 fullTextQuery.enableFullTextFilter("bestDriver");    302 fullTextQuery.enableFullTextFilter("security").setParameter("login", "andre");    303 fullTextQuery.list();   // returns only best drivers where andre has credentials
```

FIG. 3

```
@Entity
@Indexed
@FullTextFilterDefs({
    @FullTextFilterDef(name = "bestDriver", impl = BestDriversFilter.class, cache=false),  451
    @FullTextFilterDef(name = "security", impl = SecurityFilterFactory.class)  452
})
public class Driver { ... }
```

FIG. 4B

```
public class BestDriversFilter extends org.apache.lucene.search.Filter {
    public BitSet bits(IndexReader reader) throws IOException {
        BitSet bitSet = new BitSet( reader.maxDoc() );

TermDocs termDocs = reader.termDocs( new Term("score" , "5") );
        while ( termDocs.next() ) {
            bitSet.set( termDocs.doc() );
        }
        return bitSet;
    }
}
```

```
@Entity
@Indexed
@FullTextFilterDef(name = "bestDriver", impl = BestDriversFilterFactory.class) //Filter factory
public class Driver { ... } public class BestDriversFilterFactory {

@Factory
    public Filter getFilter() {
        //some additional steps to cache the filter results per IndexReader
        Filter bestDriversFilter = new BestDriversFilter();
        return new CachingWrapperFilter(bestDriversFilter);
    }
}
```

FIG. 5

```
public class SecurityFilterFactory {
    private Integer level;
    public void setLevel(Integer level) {
        this.level = level;
    }

@Key
    public FilterKey getKey() {
        StandardFilterKey key = new StandardFilterKey();
        key.addParameter(level);
        return key;
    }

@Factory
    public Filter getFilter() {
        Query query = new TermQuery( new Term("level", level.toString() ) );
        return new CachingWrapperFilter( new QueryWrapperFilter(query) );
    }
}
```

FIG. 6

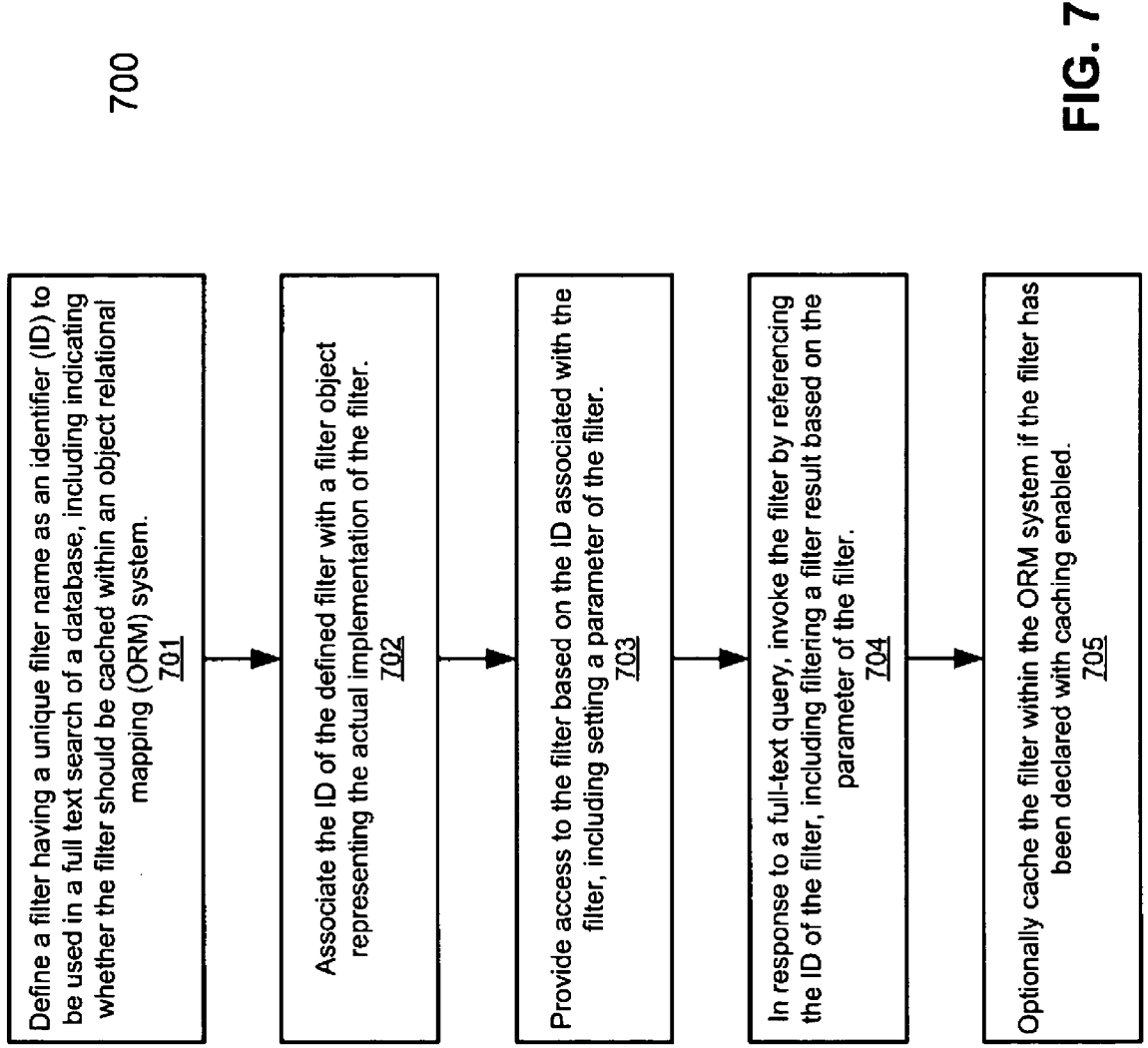

CACHING NAME-BASED FILTERS IN A FULL-TEXT SEARCH ENGINE

TECHNICAL FIELD

The present invention relates generally to object-relational mapping for accessing databases. More particularly, this invention relates to filtering database accesses via object-relational mapping.

BACKGROUND

Full-text searching of data is becoming increasingly popular and significant in the computing world. For many years, the information-retrieval community has had to deal with the storage of documents and with the retrieval of documents based on one or more keywords. Since the burgeoning of the Internet and the feasibility of storing documents on-line, retrieval of documents based on keywords has become a complex problem. A search result may contain massive information. Typically, a filter may be utilized to filter the search result to obtain narrower information based on a set of rules.

Typically, an application client that initiates a full-text search has to maintain the filter. That is, when the application client submits a full-text search query, the application client has to create and maintain a filter throughout the search session. Otherwise, the same filter has to be recreated in every search session. In addition, a filter is typically represented by a filter object referenced by a filter object handle, which an application programmer has to maintain and there is no human friendly reference.

BRIEF DESCRIPTION OF THE DRAWINGS

The present invention is illustrated by way of example and not limitation in the figures of the accompanying drawings in which like references indicate similar elements.

FIG. 3 is pseudo code illustrating an example of a full-text search query with relationship with a filter according to one embodiment.

FIGS. 4A-4C are diagrams illustrating filter definition in related to implementation according to certain embodiments.

FIGS. 5-6 are pseudo codes illustrating examples of filter implementations according to certain embodiments.

FIGS. 7-8 are flow diagrams illustrating examples of filter processes according to certain embodiments.

DETAILED DESCRIPTION

In the following description, numerous details are set forth to provide a more thorough explanation of the embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

According to certain embodiments, a filter utilized by a full-text search engine may be maintained by an object-relational mapping (ORM) system. For example, when a filter is created during a full-text search session, the filter may be cached within a cache memory of the ORM system. Upon a next full-text search session, the cached filter may be reutilized without having to recreate the same filter which has an impact on the performance (e.g., speed).

In addition, according to one embodiment, a filter may be defined via a filter name and associated with a filter implementation. For example, a filter may be defined in a filter definition file or section by a file name. The definition of the filter also identifies an implementation of the filter such as, a filter factory or implementation class in an object-oriented programming environment. That is, when defining a filter for a full-text search, an application programmer may utilize any filter name he/she likes and associates the filter name with a particular filter implementation class that is used to create and carry the functionality of the filter. Further, according to one embodiment, when defining a filter, the definition statement also allows a programmer to indicate whether the corresponding filter should be cached within the ORM system such that the ORM system can cache and reuse the filter subsequently without having to recreate the same filter.

Figure 1:
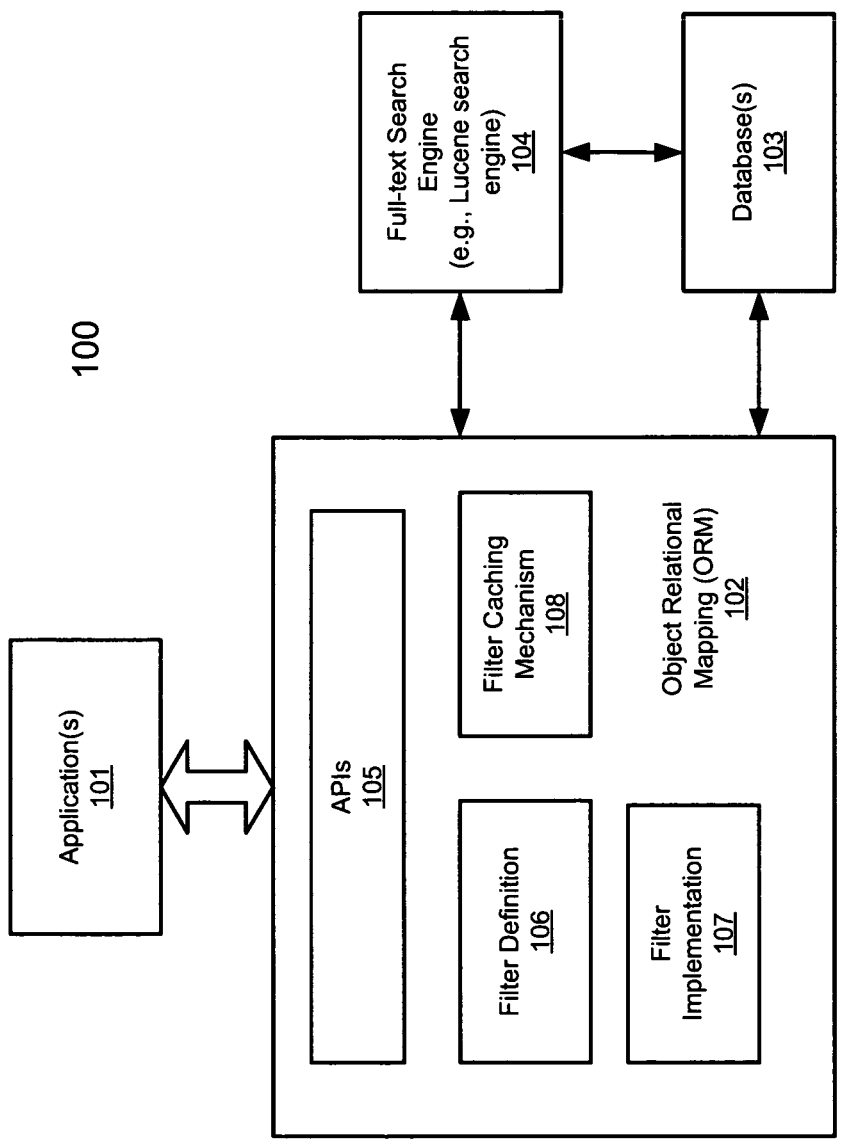
FIG. 1 is a block diagram illustrating an ORM system according to one embodiment.

FIG. 1 is a block diagram illustrating an ORM system having a filter caching mechanism according to one embodiment of the invention. Referring to FIG. 1, system 100 includes, but is not limited to, an application client 101 accessing a database or data store 103 through a common query API (application programming interface) with object-relational mapping (ORM) features, also referred to as an ORM system or framework 102. The system 102 provides the ability to map an object model's data representation to a relational data model and its corresponding database schema of the underlying database 103. For example, in a Java computing environment, the ORM 102 takes care of the mapping from Java classes to database tables and from Java data types to SQL (structured query language) data types used in a database. Note that throughout this application and for the purposes of illustration only, Java is used as an example of a cross-platform programming language. However, it is not so limited; other cross-platform programming languages, such as NET, etc., may also be applied.

Referring to FIG. 1, ORM 102 provides data query and retrieval facilities that reduce development time, which is designed to relieve a software developer from most of common data persistence-related programming tasks by reducing the need for manual, hand-crafted data processing using SQL and JDBC (Java database connectivity). The JDBC API is the industry standard for database-independent connectivity between the Java programming language and a wide range of databases—SQL databases and other tabular data sources, such as spreadsheets or flat files.

According to one embodiment, ORM 102 includes, but is not limited to, a set of APIs 105 to allow client 101 to communicate with ORM 102, a filter definition unit 106 and corresponding filter implementation unit 107, a filter caching unit, and one or more filter objects representing one or more filters which may be created by ORM 102 and cached within a cache memory (not shown) in the ORM 102.

When a search query for a full-text search is received by ORM 102 from client 101, a full-text search engine 104 is invoked to perform the requested full-text search in database 103. For example, full-text search engine 103 may be an Apache Lucene™ compatible search engine. In addition, dependent upon a specific configuration, a filter object representing a filter may be created to filter a search result generated from the search engine 103 according to certain rules or categories, such as, for example, security, temporal data (e.g., view only last month's data), population filter (e.g., search limited to a given category), etc. Thereafter, the filter object may be cached by filter caching mechanism 108 within a cache memory of ORM 102. Subsequently, if the same filter is needed for subsequent search queries, the filter object may be retrieved from the cache memory and reused without having to recreate the same filter. Thus, contrary to a conventional system in which application client 101 has to maintain the filter object, in this example, ORM 102 is configured to maintain and manage the filter object on behalf of the client 101.

In addition, according to one embodiment, a filter is defined via a definition file or section using a filter name by filter definition unit 106. Each filter definition is also associated by the filter implementation unit 107 with a filter implementation or factory that actually creates and/or implements the functionality of the filter. As a result, an application programmer of client 101 can name a filter to any name that he/she feels comfortable (e.g., easy to remember) and does not have to remember the binary number representing a handle of a filter object. Further, by referencing a filter via a filter name, it is easier to configure a filter, such as, for example, setting a particular parameter of a particular filter during a full-text search. Note that some or all components or units as shown in FIG. 1 may be implemented in software, hardware, or a combination of both. More or fewer components may be implemented and other configurations may exist.

Figure 2:
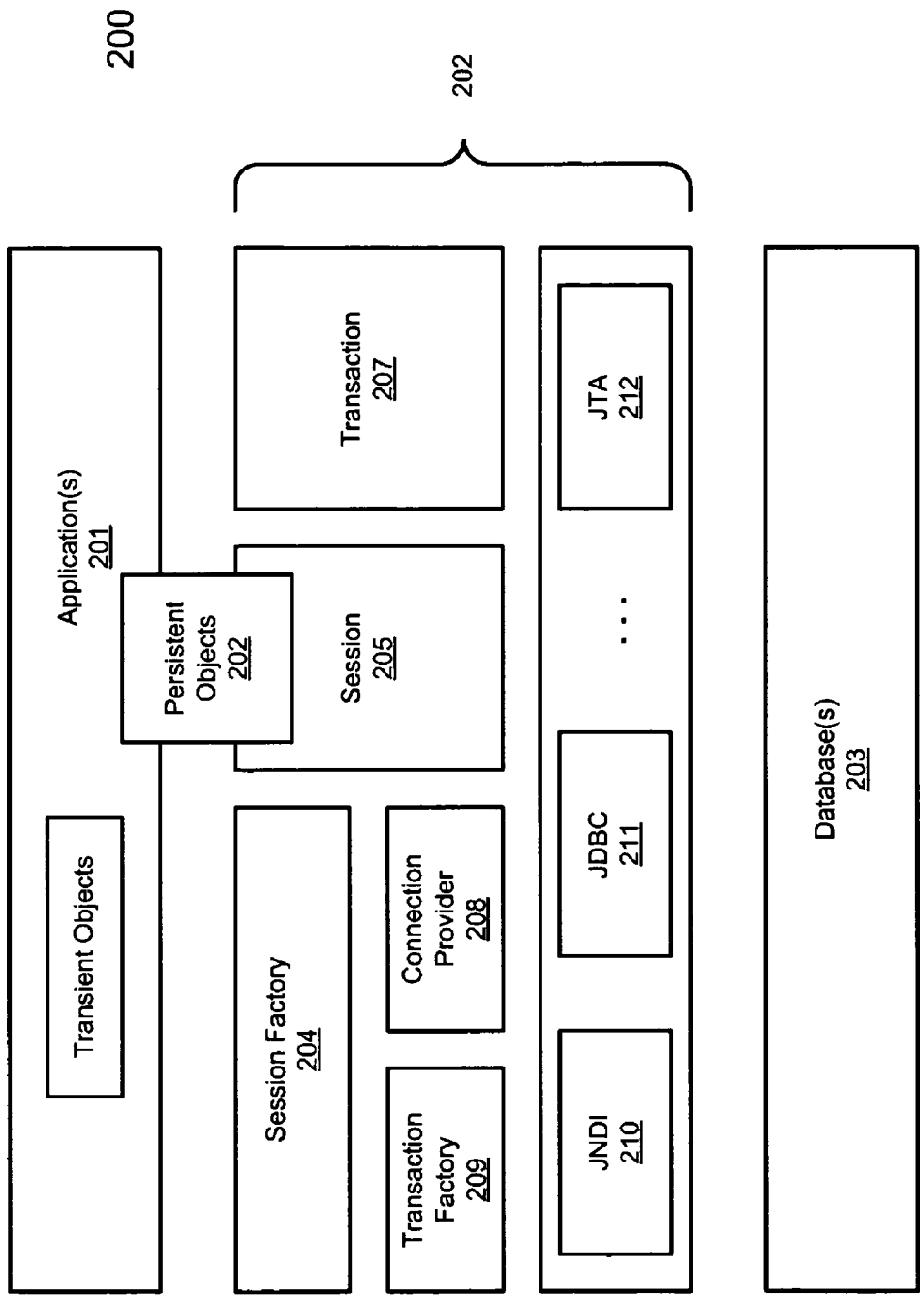
FIG. 2 is a block diagram illustrating an ORM system according to an alternative embodiment.

FIG. 2 is a block diagram illustrating an ORM application framework according to an alternative embodiment of the invention. Referring to FIG. 2, similar to framework 100 as shown in FIG. 1, framework 200 includes, but is not limited to, an application 201 accessing database 203 via an application framework 202 which may be implemented as part of framework 102 of FIG. 1. In this example, framework 202 is configured to provide persistent services to application 201.

Framework 202 includes a variety of components. For example, session factory 204 is configured to provide a thread-safe (immutable) cache of compiled mappings for a single database. Session factory 204 is a factory for session 205 and a client of connection provider 208 and it may hold an optional (e.g., second-level) cache of data that is reusable between transactions, at a process- or cluster-level. Session 205 is a single-threaded, short-lived object representing a conversation between the application 201 and the persistent store 203. Session 205 wraps a JDBC connection and is a factory for transaction 207. Session 205 holds a mandatory (first-level) cache of persistent objects, which are used when navigating an object graph or looking up objects based on an identifier.

Persistent objects 206 are short-lived, single threaded objects containing persistent state and business function. Persistent objects 206 may be, for example, ordinary JavaBeans/POJOs (plain old Java objects). Persistent objects 206 may be associated with a session (e.g., session 205). As soon as the associated session is closed, the persistent objects 206 may be detached and free to use in any application layer (e.g. directly as data transfer objects to and from presentation). Transaction 207 is a single-threaded, short-lived object used by the application to specify atomic units of work. Transaction 207 abstract applications from underlying JDBC (Java database connectivity), JTA (Java transaction API), and/or CORBA (common object request broker architecture) transactions. A session may span several transactions in some situations.

The JDBC API is the industry standard for database-independent connectivity between the Java programming language and a wide range of databases—SQL databases and other tabular data sources, such as spreadsheets or flat files. The JDBC API provides a call-level API for SQL-based database access. The JTA specifies standard Java interfaces between a transaction manager and the parties involved in a distributed transaction system, such as the resource manager, the application server, and the transactional applications. The CORBA is a standard defined by the Object Management Group (OMG) that enables software components written in multiple computer languages and running on multiple computers to interoperate. CORBA "wraps" program code into a bundle containing information about the capabilities of the code inside and how to call it. The resulting wrapped objects can then be called from other programs (or CORBA objects) across a network. CORBA uses an interface definition language (IDL) to specify the interfaces that objects will present to the world. CORBA then specifies a "mapping" from IDL to a specific implementation language like C++ or Java.

Referring back to FIG. 2, connection provider 208 is a factory for (and pool of) JDBC connections. Connection provider 208 abstracts application 201 from underlying data sources or driver managers (e.g., JNDI or Java naming and directory interface 210, JDBC 211, and JTA 212). Transaction factory 209 is a factory for transaction 207 instances. Framework 200 supports a variety of databases, including, for example, Oracle, DB2, Sybase, MS SQL server, MySQL, etc. In one embodiment, framework 200 may include modules that implement the filter definition and caching mechanisms as described above. Note that some or all of the components as shown in FIG. 2 may be implemented in hardware, software, or a combination of both hardware and software.

FIG. 3 is a pseudo code of a query programming language according to one embodiment. Referring to FIG. 3, code 300 includes a statement 301 to create a full-text query, which when submitted to an ORM system such as ORM 102 of FIG. 1, a full-text search engine such as engine 104 of FIG. 1 is invoked to perform the underlying full-text search. Within the full-text search query 301, one or more filters may be enabled or disabled where each filter may be referenced via a filter name. For example, in statement 302, a filter named "best-driver" is enabled. In statement 303, a filter named "security" is enabled with settings of one or more parameters. In this example, a filter referenced by a name of "security" is enabled only with a username of "andre" in a login field. This is also referred to as parameterizable named filter, which may be transparently cached within the ORM system. Such a filter may be defined in a filter definition block or section and associated with an actual implementation.

Figure 4A:
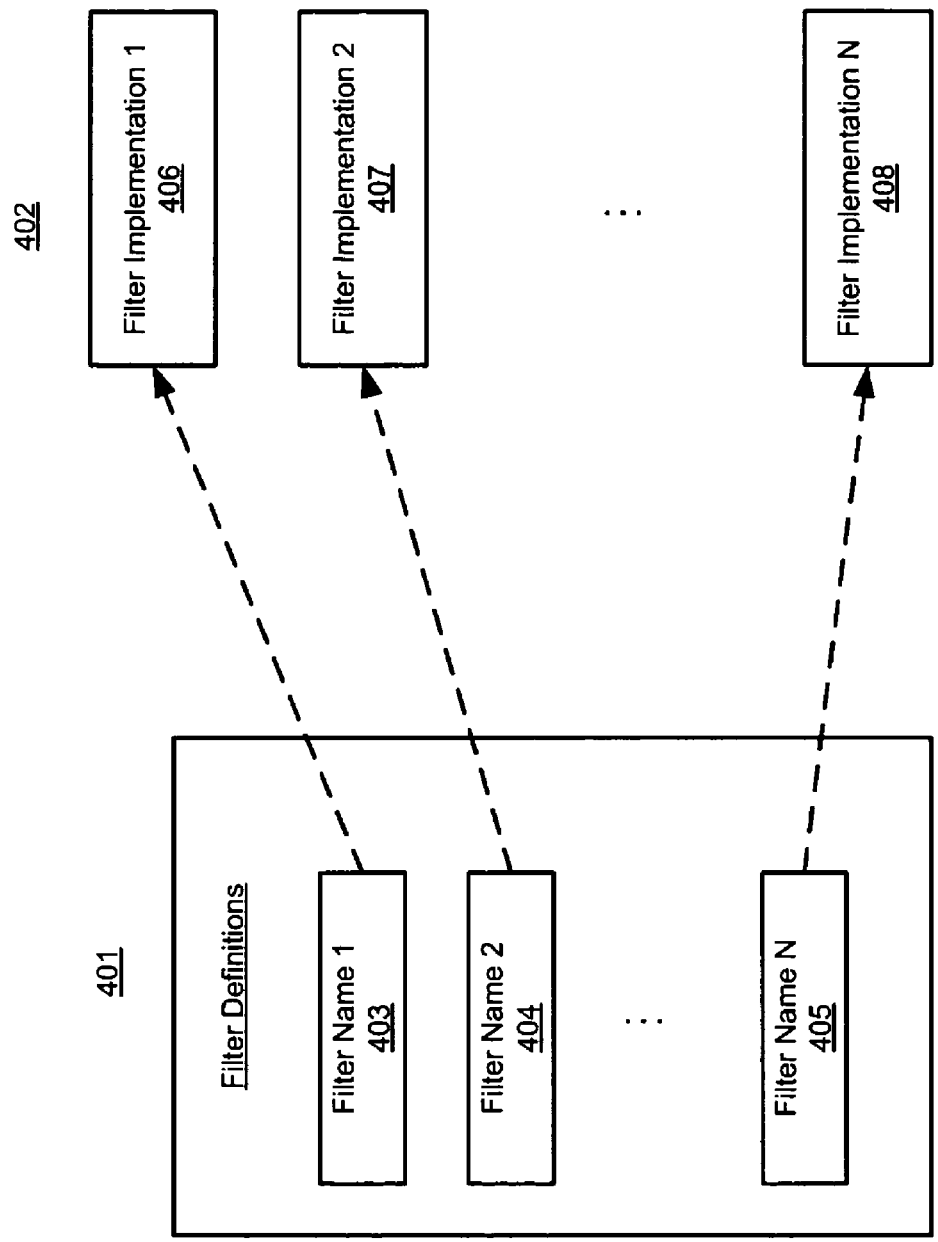

FIG. 4A is a block diagram illustrating a relationship between a filter definition and its implementation according to one embodiment of the invention. For example, filter definition block 401 and implementation 402 may be implemented as part of filter definition unit 106 and filter implementation unit 107 of FIG. 1 respectively. Referring to FIG. 4A, each of the filters defined in block 401 is defined with and referenced by a filter name (e.g., filter names 403-405) and each filter name is linked with an actual filter implementation, also referred to as a filter factory (e.g., filter implementation 406-408). Thus, when a filter is accessed, the corresponding filter name is used to identify the filter being accessed and its associated filter implementation is determined and used to perform functionality of the filter.

FIG. 4B is pseudo code illustrating an example of a filter definition annotation according to one embodiment of the invention. Referring to FIG. 4B, in this example, declaration of filters is done through an annotation of "@FullTextFilters" and this annotation can be on any "@Indexed" entity regardless of the filter operation. Here two filters 451 and 452 are defined. With respect to filter 451, a name of "bestDriver" is used to identify filter 451 and associated with a filter implementation class of "BestDriversFilter". In addition, filter 451 is defined with caching disabled by stating "cache=false" as a parameter when defining filter 451. Filter 452 is defined with a name of "security" having an implementation class of "SecurityFilterFactory". In this example, filter 452 is defined with caching enabled. Note that in this example, by default, a filter is defined with caching enabled unless indicated otherwise.

FIG. 4C is pseudo code illustrating a filter implementation according to one embodiment of the invention. Referring to FIG. 4C, a filter implementation 455 is associated with filter 451 of FIG. 4B having a filter name of "bestDriver". In this example, filter 455 will filter all results to only return drivers whose score is 5. Filter 455 is also defined via inheritance from a standard Lucene filter. In a particular embodiment, a filter requires to have a no argument constructor when referenced in the implementation.

When a filter is defined with caching enabled, this forces the ORM system to search the filter in its internal cache memory and reuses it if found. According to one embodiment, a filter using "IndexReader" may be wrapped in a Lucene "CacheWrapperFilter" to benefit from some caching speed improvement. If a filter creation requires additional operations or if a filter does not have a no-argument constructor, a filter factory or implementation may be implemented similar to one as shown in FIG. 5. In this example, the ORM search facility will look for a "@Factory" annotated method and use it to build the filter instance. The factory must have a no-argument constructor.

A named filter can benefit some parameter injection. For example, a security filter needs to know which credentials a user is willing to filter by setting the corresponding parameter and each parameter name should have an associated setter or setting function member on either the filter or filter factory of the targeted named filter definition as shown in FIG. 6. Referring to FIG. 6, a member function of "setLevel" may be used to set a parameter of "level" in the filter factory of "SecurityFilterFactory", which may be associated with a filter name of "security". Note that with respect to the method annotated "@Key" and returning a "FilterKey" object, the returned object has a special contract in which the key object must implement equals/hashcode so that two keys are equal if and only if the given filter types are the same and the set of parameters are identical. In other words, two filter keys are equal if and only if the filters from which the keys are generated can be interchanged. The key object is used as a key in the cache mechanism. "@Key" methods are needed only if a user enables the filter caching system and the corresponding filter has a parameter otherwise the caching mechanism generate a key transparently. In most cases involving parameters, using a "StandardFilterKey" implementation (provided by the framework) will be sufficient enough. It delegates the equal/hashcode implementation to each of the parameters equal and hashcode methods.

There are various advantages to use filter caching features in which the system does not have to update the targeted entity index often (e.g., the IndexReader is reuse often) and filter BitSet is relatively expensive to compute. However, caching filters could require a large cache memory within the ORM system. If there is a limited amount of cache memory available in the ORM system, certain filters that are not frequently (e.g., least recently used or LRU) used may be purged to make rooms for the new filters.

FIG. 7 is a flow diagram illustrating a process for operating filters in a full-text search according to one embodiment. For example, process 700 may be performed in system as shown in FIG. 1. Note that process 700 may be performed by processing logic which may include software, hardware, or a combination of both. Referring to FIG. 7, at block 701, a filter is defined having a unique filter name as an identifier (ID) which may be used in a full-text search of a database, where the definition also indicates whether the filter being defined should be cached within the ORM system. At block 702, the name of the defined filter is associated with an implementation of the filter and at block 703, access to the defined filter is provided by referencing the filter name including setting one or more parameters of the filter. In response to a full-text search, at block 704, the defined filter is invoked by referencing the corresponding filter name to filter the query result of the full-text search. And optionally at block 705, the filter is cached within the ORM system for future usage without having to recreate the same filter. Another word, filters are cumulative such that only results passing all the filters will be visible in the result list.

Figure 8:
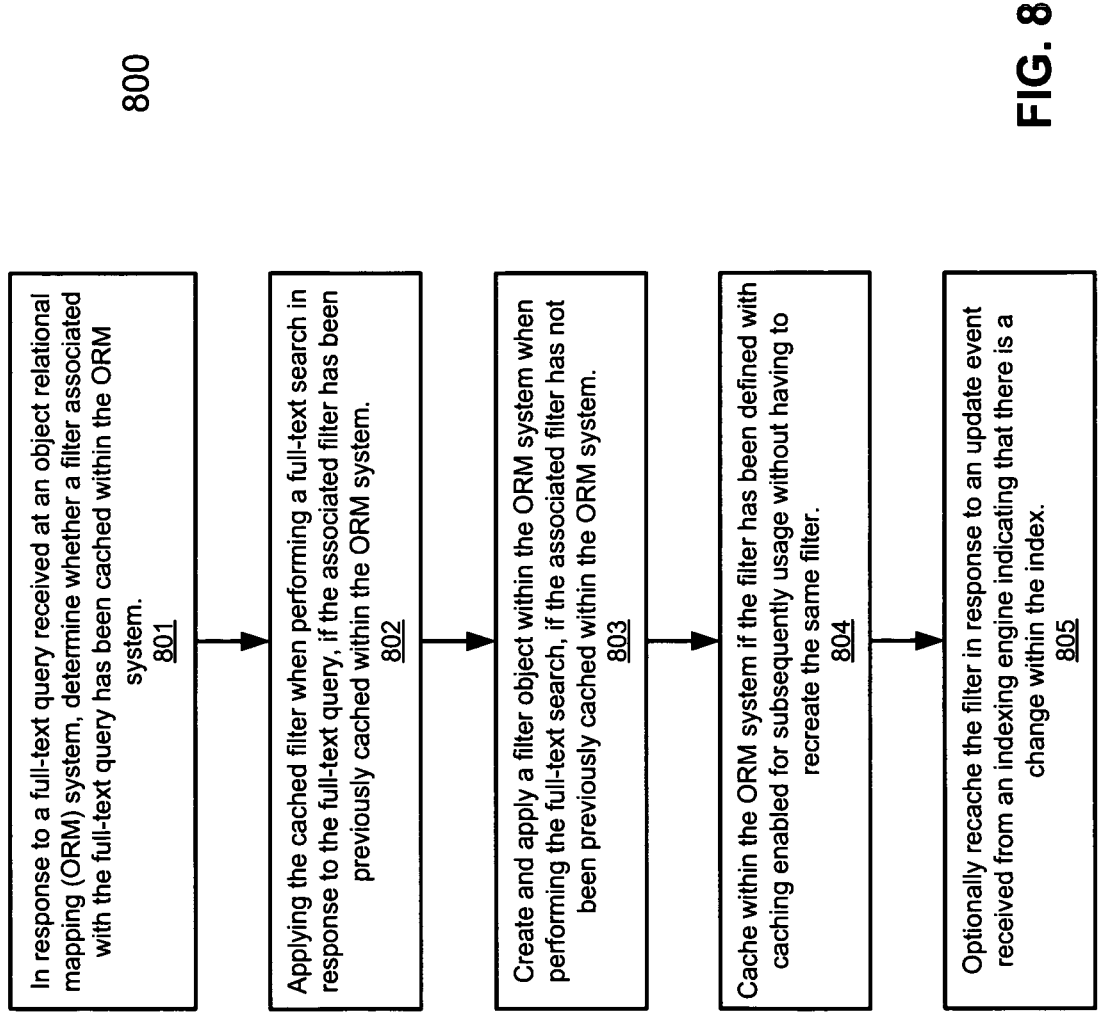

FIG. 8 is a flow diagram illustrating a process for operating filters in a full-text search according to one embodiment. For example, process 800 may be performed in system as shown in FIG. 1. Note that process 800 may be performed by processing logic which may include software, hardware, or a combination of both. Referring to FIG. 8, in response to a full-text query received at the ORM system, at block 801, processing logic determines whether a filter associated with the query has been previously cached within the ORM system. If so, at block 802, the cached filter is used when performing the full-text search. Otherwise, at block 803, a new filter is created and maintained within the ORM, where the filter is used to filter a search result performed by a full-text search engine. At block 804, the new filter is cached within the ORM if the filter has been defined with caching enabled, where the cached filter may be subsequently used by another search query without having to recreate the same filter. Optionally, at block 805, the cached filter may be recached if there is any updates resulted from an indexing engine associated with the full-text search engine.

Figure 9:
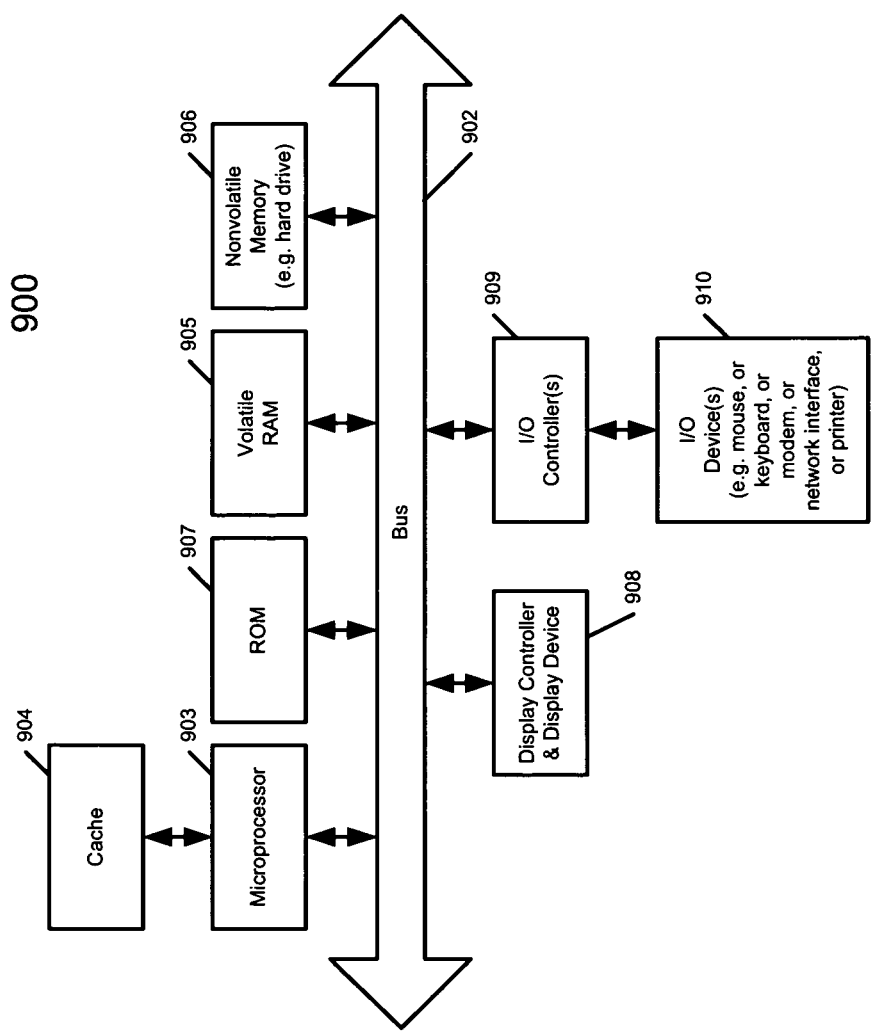
FIG. 9 is a block diagram illustrating an example of a data processing system which may be used with an embodiment.

FIG. 9 illustrates a diagrammatic representation of a machine in the exemplary form of a computer system within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein. For example, the system 900 may be used as part of system shown in FIG. 1.

As shown in FIG. 9, the system 900, which is a form of a data processing system, includes a bus or interconnect 902 which is coupled to one or more microprocessors 903 and a ROM 907, a volatile RAM 905, and a non-volatile memory 906. The microprocessor 903 is coupled to cache memory 904 as shown in the example of FIG. 9. Processor 903 may be, for example, a PowerPC microprocessor or an Intel compatible processor. Alternatively, processor 903 may be a digital signal processor or processing unit of any type of architecture, such as an ASIC (Application-Specific Integrated Circuit), a CISC (Complex Instruction Set Computing), RISC (Reduced Instruction Set Computing), VLIW (Very Long Instruction Word), or hybrid architecture, although any appropriate processor may be used.

The bus 902 interconnects these various components together and also interconnects these components 903, 907, 905, and 906 to a display controller and display device 908, as well as to input/output (I/O) devices 910, which may be mice, keyboards, modems, network interfaces, printers, and other devices which are well-known in the art.

Typically, the input/output devices 910 are coupled to the system through input/output controllers 909. The volatile RAM 905 is typically implemented as dynamic RAM (DRAM) which requires power continuously in order to refresh or maintain the data in the memory. The non-volatile memory 906 is typically a magnetic hard drive, a magnetic optical drive, an optical drive, or a DVD RAM or other type of memory system which maintains data even after power is removed from the system. Typically, the non-volatile memory will also be a random access memory, although this is not required.

While FIG. 9 shows that the non-volatile memory is a local device coupled directly to the rest of the components in the data processing system, embodiments of the present invention may utilize a non-volatile memory which is remote from the system; such as, a network storage device which is coupled to the data processing system through a network interface such as a modem or Ethernet interface. The bus 902 may include one or more buses connected to each other through various bridges, controllers, and/or adapters, as is well-known in the art. In one embodiment, the I/O controller 909 includes a USB (Universal Serial Bus) adapter for controlling USB peripherals. Alternatively, I/O controller 909 may include an IEEE-1394 adapter, also known as FireWire adapter, for controlling FireWire devices.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable medium. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description below. In addition, embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of embodiments of the invention as set forth in the following claims. The specification and drawings are, accordingly, to be regarded in an illustrative sense rather than a restrictive sense.

What is claimed is:

1. A computer-implemented method comprising:
   receiving, by an object-relational mapping (ORM) system that is executed by a processing system, a search query object for a full-text search in a relational database from an application client, wherein the search query object is in a first format that is incompatible with the relational database being searched;
   mapping, by the ORM system, the search query object to a second format that is compatible with the relational database;
   invoking, by the ORM system, a full-text search engine to perform the full-text search in view of the mapped search query object;
   creating the filter object in response to determining that a filter object associated with the search query object has not been cached within a cache memory of the ORM system;
   filtering a search result generated from the full-text search engine using the created filter object and returning the filtered search result to the application client;

caching the filter object in the cache memory of the ORM system such that the cached filter object can be used to filter a subsequent search result in response to receiving a subsequent search query object without having to recreate the filter object;

receiving, by the ORM system, the subsequent search query object for a subsequent full-text search in the relational database from the application client, wherein the subsequent search query object is in the first format that is incompatible with the relational database being searched;

mapping, by the ORM system, the subsequent search query object to the second format that is compatible with the relational database;

invoking, by the ORM system, the full-text search engine to perform the subsequent full-text search in view of the mapped subsequent search query object;

in response to determining that the filter object has been cached within the cache memory of the ORM system, retrieving the cached filter object from the cache memory of the ORM system;

filtering the subsequent search result generated from the full-text search engine using the retrieved filter object and returning the filtered subsequent search result to the application client.

2. The method of claim 1, further comprising defining a filter represented by the filter object, wherein the filter comprises an indication that caching is enabled for the filter object, and wherein caching the filter object is in response to determining that caching is enabled for the filter object.

3. The method of claim 2, wherein defining the filter comprises:
declaring the filter using a filter name in a declaration section; and
associating the filter name with a filter factory that is used to create and implement a functionality of the filter, wherein the filter factory is invoked by referencing the filter name of the filter.

4. The method of claim 3, wherein the filter is one of a plurality of filters associated with the search query object, wherein any one of the plurality of filters can be enabled or disabled by referencing a respective filter name of a respective filter.

5. The method of claim 4, further comprising in response to an update event from an indexing engine associated with the full-text search engine that an index associated with an underlying database has been changed, recaching the filter object in the cache memory of the ORM system to reflect the changed index.

6. The method of claim 5, further comprising in response to a request to set a parameter of the filter identified by the filter name, invoking the filter factory associated with the filter name to configure the parameter of the filter.

7. A non-transitory computer readable medium including instructions that, when executed by a processing system, cause the processing system to perform operations comprising:
receiving, by an object-relational mapping (ORM) system that is executed by the processing system, a search query object for a full-text search in a relational database from an application client, wherein the search query object is in a first format that is incompatible with the relational database being searched;
mapping, by the ORM system, the search query object to a second format that is compatible with the relational database;
invoking, by the ORM system, a full-text search engine to perform the full-text search in view of the mapped search query object;
creating the filter object in response to determining that a filter object associated with the search query object has not been cached within a cache memory of the ORM system;
filtering a search result generated from the full-text search engine using the created filter object and returning the filtered search result to the application client;
caching the filter object in the cache memory of the ORM system such that the cached filter object can be used to filter a subsequent search result in response to receiving a subsequent search query object without having to recreate the filter object;
receiving, by the ORM system, the subsequent search query object for a subsequent full-text search in the relational database from the application client, wherein the subsequent search query object is in the first format that is incompatible with the relational database being searched;
mapping, by the ORM system, the subsequent search query object to the second format that is compatible with the relational database;
invoking, by the ORM system, the full-text search engine to perform the subsequent full-text search in view of the mapped subsequent search query object;
in response to determining that the filter object has been cached within the cache memory of the ORM system, retrieving the cached filter object from the cache memory of the ORM system;
filtering the subsequent search result generated from the full-text search engine using the retrieved filter object and returning the filtered subsequent search result to the application client.

8. The non-transitory computer readable medium of claim 7, wherein the operations further comprise defining a filter represented by the filter object, wherein the filter comprises an indication that caching is enabled for the filter object, and wherein caching the filter object is in response to determining that caching is enabled for the filter object.

9. The non-transitory computer readable medium of claim 8, wherein defining the filter comprises:
declaring the filter using a filter name in a declaration section; and
associating the filter name with a filter factory that is used to create and implement a functionality of the filter, wherein the filter factory is invoked by referencing the filter name of the filter.

10. The non-transitory computer readable medium of claim 9, wherein the filter is one of a plurality of filters associated with the search query object, wherein any one of the plurality of filters can be enabled or disabled by referencing a respective filter name of a respective filter.

11. The non-transitory computer readable medium of claim 10, wherein the operations further comprise in response to an update event from an indexing engine associated with the full-text search engine that an index associated with an underlying database has been changed, recaching the filter object the cache memory of the ORM system to reflect the changed index.

12. The non-transitory computer readable medium of claim 11, wherein the operations further comprise in response to a request to set a parameter of the filter identified by the filter name, invoking the filter factory associated with the filter name to configure the parameter of the filter.

13. An object-relational mapping (ORM) system comprising:
- a cache memory to store a filter object associated with a search query object; and
- a processing system coupled to the cache memory to:
  - receive the search query object for a full-text search in a relational database from an application client, wherein the search query object is in a first format that is incompatible with the relational database being searched;
  - map the search query object to a second format that is compatible with the relational database;
  - invoke a full-text search engine to perform the full-text search in view of the mapped search query object;
  - create the filter object in response to a determination that the filter object has not been cached within the cache memory of the ORM system;
  - filter a search result generated from the full-text search engine using the created filter object and to return the filtered search result to the application client;
  - cache the filter object in the cache memory of the ORM system such that the cached filter object can be used to filter a subsequent search result in response to receipt of a subsequent search query object without having to recreate the filter object;
  - receive the subsequent search query object for a subsequent full-text search in the relational database from the application client, wherein the subsequent search query object is in the first format that is incompatible with the relational database being searched;
  - map the subsequent search query object to the second format that is compatible with the relational database;
  - invoke the full-text search engine to perform the subsequent full-text search in view of the mapped subsequent search query object;
  - in response to a determination that the filter object has been cached within the cache memory of the ORM system, retrieve the cached filter object from the cache memory of the ORM system; and
  - filter the subsequent search result generated from the full-text search engine using the retrieved filter object and return the filtered subsequent search result to the application client.

14. The system of claim 13, wherein the processing system is further to define a filter represented by the filter object, wherein the filter comprises an indication that caching is enabled for the filter object, and wherein caching the filter object is in response to a determination that caching is enabled for the filter object.

15. The system of claim 14, further comprising a filter factory, wherein the processing system is further to declare the filter using a filter name in a declaration section and to associate the filter name with the filter factory that is used to create and implement a functionality of the filter, and wherein the filter factory is invoked by referencing the filter name of the filter.

16. The system of claim 15, wherein the filter is one of a plurality of filters associated with the search query object, wherein any one of the plurality of filters can be enabled or disabled by referencing a respective filter name of a respective filter.

17. The system of claim 16, wherein the processing system is further to, in response to an update event from an indexing engine associated with the full-text search engine that an index associated with an underlying database has been changed, recache the filter object in the cache memory of the ORM system to reflect the changed index.

* * * * *

UNITED STATES PATENT AND TRADEMARK OFFICE
CERTIFICATE OF CORRECTION

Page 1 of 1

PATENT NO. : 8,612,467 B2
APPLICATION NO. : 12/074042
DATED : December 17, 2013
INVENTOR(S) : Emmanuel Bernard It is certified that error appears in the above-identified patent and that said Letters Patent is hereby corrected as shown below:

Title Page, Item (57)

In the Abstract, line 13, delete "recreating" and insert --recreate--

In the Claims

In claim 1, column 8, line 61, delete "creating the filter object in response to determining that a" and insert --creating a filter object in response to determining that the--

In claim 7, column 10, line 4, delete "creating the filter object in response to determining that a" and insert --creating a filter object in response to determining that the--

Signed and Sealed this
Twentieth Day of January, 2015

Michelle K. Lee
*Deputy Director of the United States Patent and Trademark Office*